(12) United States Patent
Yamawaki

(10) Patent No.: US 6,756,583 B2
(45) Date of Patent: Jun. 29, 2004

(54) OPTICAL SCANNING DEVICE AND IMAGE FORMING APPARATUS WHEREIN THE LIGHT SOURCE IS KEPT CONTINUOUSLY LIT BETWEEN LINE SCANS

(75) Inventor: Takeshi Yamawaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/837,213

(22) Filed: Apr. 19, 2001

(65) Prior Publication Data
US 2002/0014582 A1 Feb. 7, 2002

(30) Foreign Application Priority Data
Apr. 20, 2000 (JP) ......................... 2000-119740

(51) Int. Cl.[7] ............................. H01J 3/14; G02B 26/08
(52) U.S. Cl. .................... 250/234; 359/216; 358/494
(58) Field of Search ............................. 359/204, 203, 359/216, 201, 217, 209; 250/234, 235, 236; 358/443, 444, 489

(56) References Cited

U.S. PATENT DOCUMENTS

| | | | | |
|---|---|---|---|---|
| 4,306,242 A | * | 12/1981 | Jeffery | 346/1.1 |
| 5,161,047 A | * | 11/1992 | Tomita et al. | 359/216 |
| 5,750,986 A | * | 5/1998 | Genovese | 250/235 |
| 5,774,248 A | * | 6/1998 | Komatsu | 359/204 |
| 5,786,594 A | * | 7/1998 | Ito et al. | 250/236 |
| 6,266,174 B1 | * | 7/2001 | Aoki | 359/204 |
| 6,288,818 B1 | * | 9/2001 | Yoshimaru | 359/204 |

* cited by examiner

Primary Examiner—Stephone B. Allen
(74) Attorney, Agent, or Firm—Fitzpatrick, Cella, Harper & Scinto

(57) ABSTRACT

An optical scanning device includes a first optical system, including a light source, for directing a light beam, emitted from the light source, to an optical deflector. A second optical system focuses the light beam deflected by the deflector on an effective scanning area of a scanning surface. The light source is continuously kept lit when scanning outside of the effective scanning area. A light shield member is positioned between the deflector and the scanning surface to block at least a portion of the light beam emitted during the period of time when the light source is continuously kept lit when scanning outside of the effective scanning area.

20 Claims, 10 Drawing Sheets

SECTION TAKEN ALONG LINE AA'

WITH SEMICONDUCTOR LASER CHIP NOT TILTED

WITH SEMICONDUCTOR LASER CHIP TILTED

WITH SEMICONDUCTOR LASER CHIP SHIFTED

INCIDENT LIGHT

SECTION IN SUB-SCAN OPERATION TAKEN ALONG LINE CC'

OPTICAL SCANNING DEVICE AND IMAGE FORMING APPARATUS WHEREIN THE LIGHT SOURCE IS KEPT CONTINUOUSLY LIT BETWEEN LINE SCANS

BACKGROUND OF THE INVENTION

1. Field of the Invention

The present invention relates to an optical scanning device and an image forming apparatus incorporating the optical scanning device, and, more particularly to an optical scanning device and an image forming apparatus employing the optical scanning device which performs an optical scan at a fast speed with a light source thereof remaining lit between scans, presents a high scanning efficiency, and is appropriate for use in a digital copying apparatus or a laser beam printer.

2. Description of the Related Art

Optical scanning devices have been widely used as optical writing systems in laser beam printers (LBP) or digital copying apparatuses. As these devices are in widespread use, high image-quality and high-speed requirements are mounting. For example, to achieve a high resolution of 600 dpi, a miniature spot of 60 $\mu$m or so must be formed on a scanning surface. Since the diameter of a scanning beam becomes large, an optical deflector (polygon mirror) must be accordingly large. A large-scale polygon mirror needs to make a trade-off with the high-speed requirement.

A variety of proposals to achieve a high-speed operation have been made. For example, some of the proposed techniques include a multi-beam scanning method having an increased number of beams for performing parallel line scanning, and an OFS (Over-Filled Scanner) using an OFS scanning system having a small-diameter and multi-facet polygon mirror, as opposed to a conventional UFS (Under-Filled Scanner) using a UFS optical system.

The OFS is promising as a method for overcoming the following problems of a high-speed UFS method.

The UFS method, employing a polygon mirror, projects a light beam having a predetermined beam width to one deflection surface (reflective surface) of a polygon mirror, thereby forming a miniature spot having a spot diameter narrower than the width of the deflection surface in the main scan direction. As the deflection surface rotates in the UFS method, the arrival location of an incident light beam on the deflection surface moves. To keep the incident light beam free from shading within a predetermined scanning angle range, the width of the deflection surface in the main scan direction needs to be larger than a predetermined width. This leads to a large polygon mirror. If the number of deflection surfaces of the polygon mirror is increased, the polygon mirror becomes bulky, resulting in a large load in rotation. This presents difficulty in rotating the polygon mirror at a high speed. The UFS method typically implements a high-speed design with a multi-beam technique adopted. The multi-beam technique involves a complex construction.

The ratio of a theoretical scanning angle range, within which one deflection surface can scan a light beam, to a scanning angle range for scanning an effective scanning area is now referred to as a scanning efficiency. In the UFS method, the input light beam has a predetermined beam width, and the scanning angle range is determined on condition that the incident beam is free from shading on the deflection surface. The high-resolution UFS method using a large diameter beam typically offers a scanning efficiency of 70% or so. The remaining 30% is shared on portions prior to and subsequent to the image forming area, and is utilized to perform electrical processings such as stabilizing the output of the light source and detecting the write start timing of an image.

Subsequent to the end of the scanning of one line of the image forming area, the light source is extinguished. An undesired light beam not contributing to scanning can impinge on the end of an optical member or a structure supporting the optical member. The undesired light beam can then be reflected and scattered in a flare, which reaches the scanning area, thereby degrading the image. The extinction of the light beam is intended to prevent such image degradation from taking place.

At the scanning start end, the light source needs to be lit prior to the effective scanning area to detect the image write start position. The generation of similar flares is unavoidable. A light shield plate is installed or an optical member and a support member are properly configured for the flare not to reach the scanning surface even if such flare is generated.

In the OFS method, a light beam emitted from a light source is directed to a deflection surface of a polygon mirror with the beam width thereof being wider than the width of the deflection surface in the main scan direction (in other words, the light beam is incident on a plurality of deflection surfaces in a straddling fashion). One deflection surface thus rotates across the incident light beam. Since the width of the incident light beam is large enough, the incident light beam is not shaded by the scanning angle range of the polygon mirror. The width of the deflection surface may be set to be the same as the width of the incident light beam in the UFS system. Even if the number of deflection surfaces is increased, the diameter of the polygon mirror does not become as large as that in the UFS system. High-speed scanning is accomplished with the increased number of deflection surfaces.

Theoretically, the OFS system enables the scanning operation to function at a scanning efficiency of 100%. In practice, however, the scanning efficiency is restricted to 90% or so to assure time for the output of the light source to stabilize and time for detecting the image write timing prior to the start of the scanning.

With the number of deflection surfaces of the polygon mirror increased without enlarging the polygon mirror and the scanning efficiency increased, the OFS system enables a scanning device to scan at a high speed. With a multi-beam technique implemented, the OFS system permits an even higher speed scanning operation.

When a high-speed scanning feature is implemented, a scanning time for one line becomes short. A substantially high speed process must be performed for a short lighting preparation time prior to the scanning start. Process speed is determined by the performance of circuit control devices and the stability characteristic of a rising edge of the light source.

The process speed requirement for the OFS system is rigorous, because the OFS system has a scanning efficiency higher than that of the UFS system. There is no time available for the device to extinguish the light source subsequent to the end of one line of the effective scanning area, since the next line scanning starts soon. If the light source is extinguished, a rise time for the light source to reach a predetermined light intensity thereof is not assured.

Accuracies in the detecting of an image write start position prior to the line scanning start and the detecting of the output of the light source drop, thereby degrading a resulting image.

SUMMARY OF THE INVENTION

It is an object of the present invention to provide an optical scanning device and an image forming apparatus incorporating the optical device which includes a light shield member between an optical deflector and a scanning surface for blocking at least a portion of a light beam which is reflected and deflected by the optical deflector and scans outside an effective scanning area, thereby controlling flare light, wherein a light source remains lit during a period of time between the scanning of a plurality of lines on the effective scanning area.

The present invention in one aspect relates to an optical scanning device and includes a first optical system, including a light source, for directing a light beam emitted from the light source to an optical deflector, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area.

A scanning efficiency of the optical scanning device is preferably 70% or higher.

Preferably, the light beam from the first optical system is incident at an oblique angle on a deflection surface of the deflector in a sub scanning cross-sectional plane.

The present invention in another aspect relates to an image forming apparatus and includes an optical scanning device including a first optical system, including a light source, for directing a light beam emitted from the light source to a deflector, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area. The image forming apparatus further includes a photoconductive body arranged on the scanning surface of the optical scanning device, a development unit for developing, into a toner image, an electrostatic latent image that has been formed with the light beam scanning the photoconductive body, a transfer unit for transferring the developed toner image onto a paper sheet, and a fixing unit for fixing the transferred toner image onto the paper sheet.

The present invention in yet another aspect relates to an image forming apparatus and includes an optical scanning device including a first optical system, including a light source, for directing a light beam emitted from the light source to a deflector, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area. The image forming apparatus further includes a printer controller for converting code data input from an external device into an image signal and feeding the image signal to the optical scanning device.

Preferably, the image is formed through a BAE (Background Area Exposure) process.

The present invention in still another aspect relates to an optical scanning device and incudes a first optical system, including a light source, for directing a light beam emitted from the light source to a deflection surface of a deflector in a beam width wider than the width of the deflection surface in a main scan direction, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area.

Preferably, a scanning efficiency of the optical scanning device is 80% or higher.

Preferably, the light beam from the first optical system is incident at an oblique angle on a deflection surface of the deflector in a sub scanning cross-sectional plane.

The present invention in still another aspect relates to an image forming apparatus and includes an optical scanning device including a first optical system, including a light source, for directing a light beam emitted from the light source to a deflection surface of a deflector in a beam width wider than the width of the deflection surface in a main scan direction, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area, and wherein the width of a border area between adjacent deflection surfaces of the deflector in a main scan direction is 1% or less of the width of each deflection surface in the main scan direction.

The present invention in still another aspect relates to an image forming apparatus and includes an optical scanning device including a first optical system, including a light source, for directing a light beam emitted from the light source to a deflection surface of a deflector in a beam width wider than the width of the deflection surface in a main scan direction, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area, and wherein in a border area between adjacent deflection surfaces of the deflector, one deflection surface extends over the other deflection surface, and the length of the extension in the main scan direction is 5% or less of the beam width of the light beam reflected and deflected from the deflection surface in the main scan direction.

The present invention in still another aspect relates to an image forming apparatus and includes an optical scanning device including a first optical system, including a light source, for directing a light beam emitted from the light source to a deflection surface of a deflector in a beam width wider than the width of the deflection surface in a main scan direction, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area. The image forming apparatus further includes a photoconductive body arranged on the scanning surface of the optical scanning device, a development unit for developing, into a toner image, an electrostatic latent image that has been formed with the light beam scanning the photoconductive body, a transfer unit for transferring the developed toner image onto a paper sheet, and a fixing unit for fixing the transferred toner image onto the paper sheet.

The present invention in still another aspect relates to an image forming apparatus and includes an optical scanning device including a first optical system, including a light source, for directing a light beam emitted from the light source to a deflection surface of a deflector in a beam width wider than the width of the deflection surface in a main scan direction, and a second optical system for focusing the light beam, reflected and deflected by the deflector, on an effective scanning area of a scanning surface, thereby scanning a plurality of lines on the effective scanning area, wherein the light source remains lit during a period of time between the scanning of each of the plurality of lines on the effective scanning area and wherein a light shield member is positioned between the deflector and the scanning surface to block at least a portion of the light beam emitted during the period of time between the scanning of each of the plurality of lines on the effective scanning area. The image forming apparatus further includes a printer controller for converting code data input from an external device into an image signal and feeding the image signal to the optical scanning device.

Preferably, the image is formed through a BAE process.

Further objects, features, and advantages of the present invention will be apparent from the following description of the preferred embodiments with reference to the attached drawings.

DESCRIPTION OF THE PREFERRED EMBODIMENTS

First Embodiment

Figure 1A:
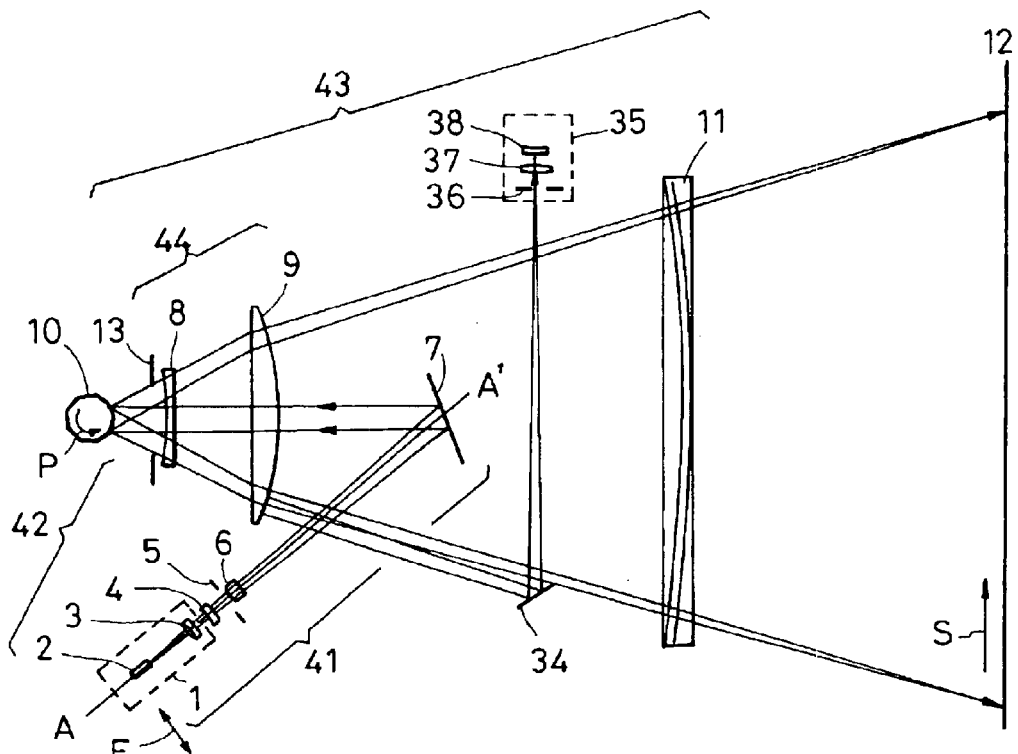
FIG. 1A is a main scan cross-sectional view showing a major portion of a first embodiment of the present invention.
Figure 1B:
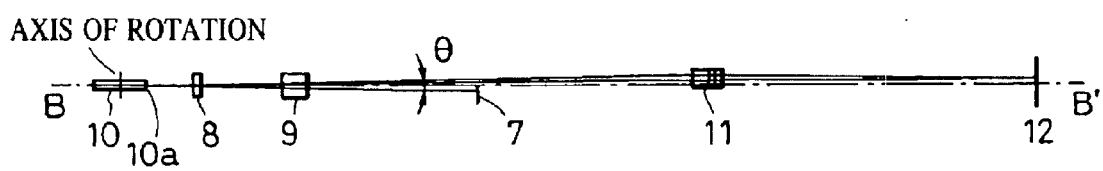
FIG. 1B is a sub scan cross-sectional view.
Figure 1C:
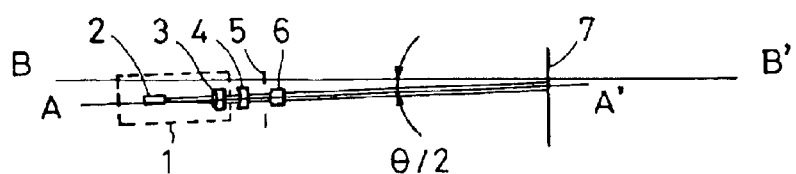
FIG. 1C is a cross-sectional view of an input system taken along line AA'.

FIG. 1A shows a main scan cross section of a first embodiment of an optical scanning device of the present invention. FIG. 1B shows a sub scan cross section of the optical scanning device. FIG. 1C is a sectional view of a major portion of an input optical system taken along a plane perpendicular to the main scan cross section (i.e., a cross section taken along AA').

The main scan cross section refers to a cross section of an optical scanning system projected onto a plane perpendicular to the axis of rotation of a polygon mirror, and the sub scan cross section refers to a cross section in a plane which is perpendicular to the main scan cross-sectional plane and in which the axis of rotation of the polygon mirror lies.

As shown, a laser unit (an optical unit) 1 includes a semiconductor laser (a laser light source) 2 and a collimator lens unit 3 having two spherical lenses cemented to each other. By performing a predetermined optical adjustment, a collimator lens unit 3 outputs a collimated light beam in parallel with the optical axis thereof. The laser unit 1 includes a shift adjustment mechanism (not shown) for parallel shifting the collimator lens unit 3 in a direction represented by an arrow E perpendicular to the optical axis of the collimator lens unit 3 in the main scan cross-sectional plane.

In the first embodiment, the semiconductor laser 2 is not extinguished even when a light beam scans a non-effective area outside an effective scanning area. Specifically, the semiconductor laser 2 continuously remains lit from an image formation cycle to the start of a next line scanning (the period of time between the scanning). The semiconductor laser 2 in the first embodiment is applicable to any of a single beam light source and a multi-beam light source.

A concave lens 4 of negative power slightly diverges the collimated light beam emitted from the laser unit 1. A diaphragm aperture 5 limits the passage of the light beam, thereby configuring the beam shape of the light beam. A cylindrical lens 6 has a predetermined refractive power in the sub scan direction. A reflective mirror 7 reflects the light beam from the cylindrical lens 6 toward an optical deflector 10.

An input optical system 41 is composed of the laser unit 1, the concave lens 4, the diaphragm aperture 5, the cylindrical lens 6, and the reflective mirror 7. A first optical system 42 is composed of the input optical system 41, and first and second fθ lenses 8 and 9.

The optical deflector 10 is a polygon mirror used as a deflection means. A drive mechanism (not shown) rotates the optical deflector 10 at a constant speed in a direction represented by an arrow P.

A second optical system 43 includes an fθ lens system 44 composed of the first and second fθ lenses 8 and 9, and an elongated cylindrical lens 11. In the first embodiment, the fθ lens system 44 includes the spherical concave lens 8 as the first fθ lens and the cylindrical concave lens 9 as the second fθ lens. The fθ lens system 44, having a refractive power chiefly in the main scan direction, appropriately corrects fθ characteristics and the curvature of field in the main scan direction within the effective scanning area. The elongated cylindrical lens 11, having a refractive power chiefly in the sub scan direction, causes a deflection surface of the optical deflector 10 to be optically conjugate to a scanning surface in the sub scan cross-sectional plane. The elongated cylindrical lens 11 thus prevents a tilt of the deflection surface from deviating an exposure position on the surface of a photoconductive drum 12, thereby controlling variations in the pitch of an image. Further, the elongated cylindrical lens 11 limits the curvature of field on the photoconductive drum 12 in the sub scan direction, while keeping magnification to a constant to control a variation in a spot diameter.

The elongated cylindrical lens 11, having a refractive power chiefly in the sub scan direction, is arranged nearby the photoconductive drum 12 to set the magnification of the device from the optical deflector 10 to the photoconductive drum 12 in the sub scan direction to be one or smaller and to alleviate pitch variations in response to the eccentricity of the axis of rotation of the optical deflector 10.

The photoconductive drum 12 serves as a scanning surface. A light shield member 13 is arranged between the polygon mirror 10 and the fθ lens system 44. The light shield member 13 blocks an undesired light beam reflected and deflected by the polygon mirror 10 at the scanning start end and the scanning stop end (a portion of the light beam, reflected and deflected by the optical deflector 10, scanning outside the effective scanning area).

A reflective mirror (also referred to as beam detect (BD) mirror) 34 is arranged in a scanning line in the main scan direction. The reflective mirror 34 reflects, to a synchronization detection device 38 to be discussed later, a synchronization detection light beam (BD light beam) for adjusting the timing of a scanning start position on the photoconductive drum 12. A BD slit 36 for synchronization detection, arranged at a position optically equivalent to the photoconductive drum 12, determines an image write start position. A condenser lens (also referred to as a BD lens) 37 causes the BD mirror 34 to be optically conjugate with the synchronization detection device 38, thereby correcting a tilt of the BD mirror 34. The synchronization detection device (also referred to as a BD sensor) 38 is an optical sensor for synchronization detection. In the first embodiment, a synchronization signal (a BD signal), obtained by detecting an output signal from the BD sensor 38, is used to adjust the timing of the scanning start position of an image recording on the photoconductive drum 12. The BD slit 36, the BD lens 37, and the BD sensor 38 constitute a write start position detection optical system 35.

As already discussed, the light source is not switched off but continuously remains lit even outside the effective scanning area in each scanning line. This arrangement improves the accuracy of the detection of the image write position and the stability of output of the light source, thereby forming a good image. The components of the optical scanning device are set so that the scanning efficiency of the optical scanning device of the first embodiment is 80% or more.

The optical operation of the first embodiment is now discussed referring to FIG. 1A.

As shown, a collimated light beam emitted from the laser unit 1 is converted into a slightly diverged light beam by the concave lens 4, shaped in a beam diameter thereof through the diaphragm aperture 5, transmitted through the cylindrical lens 6, and reflected from the reflective mirror 7. The light beam is transmitted through the second fθ lens 9 and the first fθ lens 8, constituting the fθ lens system 44, and becomes a collimated light beam again. The collimated light beam is then incident on the deflection surface of the polygon mirror 10 at the approximate center of a deflection angle in a front surface entry. The beam width of the collimated light beam in the main scan direction is sufficiently large with respect to the width of a facet of the deflection surface of the polygon mirror 10. Specifically, a plurality of deflection surfaces of the polygon mirror 10 are irradiated with the light beam (the over-filled scanning system).

The light beam, reflected and deflected by the polygon mirror 10, is partly blocked by the light shield member 13 at the scanning start end and the scanning stop end, transmitted through the first fθ lens 8 and the second fθ lens 9, and guided onto the photoconductive drum 12. By rotating the polygon mirror 10 in the direction represented by the arrow P, the light beam scans the photoconductive drum 12 in a uniform motion in the direction represented by an arrow S. In this way, an image is recorded on the photoconductive drum 12 as a recording medium.

A portion of the light beam, reflected and deflected by the polygon mirror 10, is reflected from the BD mirror 34 upstream of the effective scanning area, and is incident on the write start position detection optical system 35. The write start position detection optical system 35 detects time at which the light beam passes thereacross. The BD sensor 38 detects the light beam passing across the BD slit 36 in a signal waveform, thereby detecting the rise time of the signal waveform. An image is written subsequent to a delay time determined from the rise time. The image write start position in each line is thus aligned.

The optical operation of the first embodiment is now discussed, referring to FIG. 1C.

As shown in FIG. 1C, the optical elements from the laser unit 1 through the cylindrical lens 6 are arranged in the same optical axis (line AA'). The optical axis AA' is inclined at an oblique angle of θ/2 with respect to a plane (line) BB' perpendicular to the axis of rotation of the polygon mirror 10.

In the first embodiment, θ/2 equals 0.8°. When the light beam is incident on the polygon mirror 10 from within the scanning area field, the oblique incident angle of θ/2 is a requirement to separate the scanning light beam, reflected and deflected from the polygon mirror 10, from the input light beam. The larger the oblique incident angle θ/2, the better to separate the two beams. To achieve a good focusing performance without using a special lens and to control the curvature of field, the oblique incident angle is preferably less than 1°.

The collimated light beam emitted from the laser unit 1 is converted into a slightly diverged beam by the concave lens 4, shaped in a predetermined beam diameter thereof through the diaphragm aperture 5, transmitted through the cylindrical lens 6, transmitted through the second fθ lens 9 and the first fθ lens 8, and focused on a deflection surface 10a of the polygon mirror 10. The reflective mirror 7 is arranged in parallel with the axis of rotation of the polygon mirror 10.

In this arrangement, the converged light beam slantly incident from the cylindrical lens 6 is not twisted, and the focus line incident on the deflection surface 10a is not rotated and remains fixed in a plane perpendicular to the optical axis.

In an optical system in which a light beam emitted from a light source is incident on a deflection surface of an optical deflector in a main scan cross-sectional plane, there are times when the deflection surface of the optical deflector becomes perpendicular to the input light beam as the optical deflector rotates with a light source continuously lit. In such a case, a specularly reflected light beam returns from the deflection surface back to the light source, thereby substantially degrading the stability of the output of the light source. With such a problem, the continuous lighting of the light source becomes meaningless.

In the first embodiment, the light beam from the first optical system 42 is incident at a slant angle to the deflection surface 10a of the polygon mirror 10 in the sub scan cross-sectional plane. This arrangement prevents the specularly reflected light beam from the deflection surface 10a from returning to the light source. The light source is thus stabilized.

The optical operation of the first embodiment will now be discussed, referring to FIG. 1B.

As shown in FIG. 1B, the light beam incident on the deflection surface 10a of the polygon mirror 10 at an oblique angle is reflected and deflected in a sector by the deflection surface 10a as the polygon mirror 10 rotates. The optical axis of the first and second fθ lenses 8 and 9 is positioned substantially in parallel with the line BB' so that the input light beam and output light beam are separated. In practice, however, the first and second fθ lenses 8 and 9 are inclined by 1° or less in the sub scan cross-sectional plane. If the light beam reflected from the reflective mirror 7 is specularly reflected from the first and second fθ lenses 8 and 9, the first and second fθ lenses 8 and 9 are inclined to prevent the specularly reflected light beam from being directed to the scanning surface.

As already discussed, the elongated cylindrical lens 11 having refractive power chiefly in the sub scan direction is arranged between the second fθ lens 9 and the photoconductive drum 12. The elongated cylindrical lens 11 focuses the light beam on the photoconductive drum 12 in the sub scan direction, and causes the deflection surface 10a of the polygon mirror 10 to be optically conjugate to the photoconductive drum 12, thereby correcting a tilt of the polygon mirror 10. The curvature of radius of the lens in the sub scan direction is varied along the longitudinal direction thereof in both surfaces thereof. The elongated cylindrical lens 11 thus limits the curvature of field on the photoconductive drum 12 in the sub scan direction, while keeping magnification constant to control variation in a spot diameter. Since the scanning path of the light beam incident on the elongated cylindrical lens 11 is curved, the optical axis of the elongated cylindrical lens 11 is decentered in the sub scan direction to control the scanning line curvature and to improve focusing performance on the photoconductive drum 12. In this way, the input light beam is transmitted through a location out of the optical axis.

Figure 2:
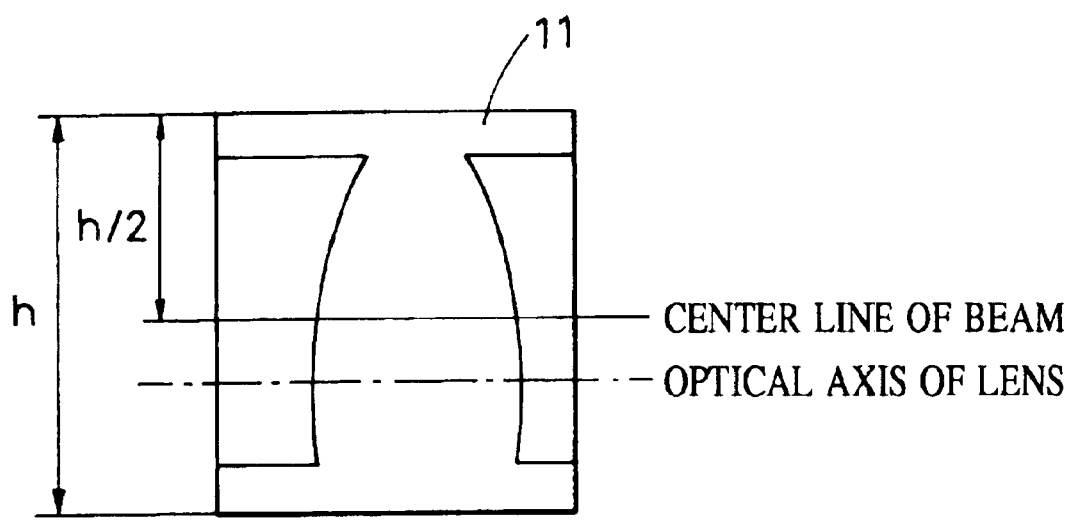
FIG. 2 shows a decentered structure of an elongated cylindrical lens.

FIG. 2 shows the lens configuration of the elongated cylindrical lens 11. As shown, the center of the light beam is positioned above the optical axis of the lens. To embody such a lens configuration, the elongated cylindrical lens 11 is fabricated of a plastic molding. Since the elongated cylindrical lens 11 needs no refractive power in the main scan direction, both surfaces have the same curvature of radius, and the thickness thereof is constant. The constant thickness allows molding characteristics to be stabilized.

The following table lists the structure of the optical system from the polygon mirror 10 to the photoconductive drum 12.

TABLE

Optical structure from the deflector to the scanning surface (the polygon mirror has 12 facets with the circumscribing circle ψ having a diameter of 29 mm)

| Surface No. | r | d | n |
|---|---|---|---|
| Defl. point |  | 25.0 |  |
| 1 | −356.2 | 4.0 | 1.7661 |
| 2 | Infinity | 41.5 |  |
| 3 | Infinity | 15.0 | 1.6966 |
| 4 | −152.57 | 213.9 |  |
| 5m | 1000 | 4.0 | 1.5276 |
| 5s | 114.1 |  |  |
|  | D2 = 6.63E−6 |  |  |
| 6m | 1000 | 167.0 |  |
| 6s | −108.2 |  |  |
|  | D2 = 8.05E−6 |  |  |
| Scanning surface |  |  |  |

The surface number identifies the lens surface number of the lens from the deflector side. The letter m represents the main scan direction, the letter s represents the sub scan direction, and the letter r represents the curvature of radius of each lens. The letter d represents the space between one surface and the next surface in the main scan cross-sectional plane, D2 represents the aspherical surface coefficient r(y)=ro (1+D2*y^2), and n represents the index of refraction.

The optical operation of each optical element will now be discussed.

In the laser unit 1, the space and angle of view between the semiconductor laser 2 and the collimator lens unit 3 are adjusted. The laser unit 1 is mounted with a predetermined precision, and emits a collimated light beam in parallel with the optical axis of the collimator lens unit 3. To reduce spherical aberration and chromatic aberration, the collimator lens unit 3 is formed of a doublet which is composed of cemented concave element and convex element arranged from the semiconductor laser 2 and made of different glass materials. In the OFS optical system, the collimated light beam emitted from the laser unit 1 is partly cut away in the main scan direction by the deflection surface 10a of the polygon mirror 10, thereby becoming a deflected light beam. The effective light beam of the collimated light beam contributed to scanning is moved out of the optical axis in proportion to the deflection angle, thereby increasing the quantity of spherical aberration contained in the light beam. For this reason, a dark F number, which would be sufficiently provided by a single lens element in the UFS optical system, requires a doublet for reducing spherical aberration in the OFS optical system. The correction of chromatic aberration is intended to control variations in focusing attributed to variations in the wavelength of the semiconductor laser 2 arising from ambient temperature change.

Figure 3A:
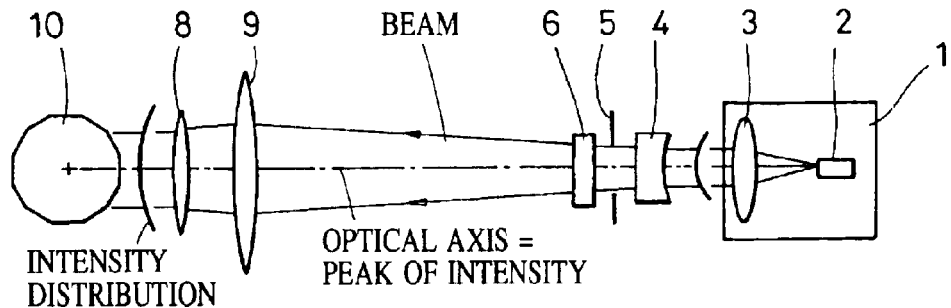
FIGS. 3A–3C illustrate the principle for shift adjustment of a laser unit.
Figure 3B:
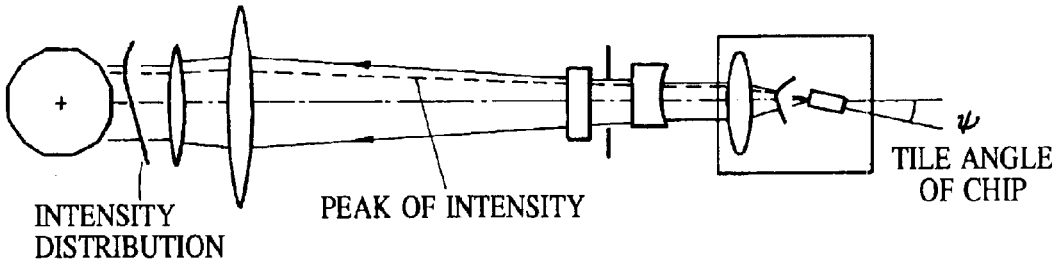
Figure 3C:
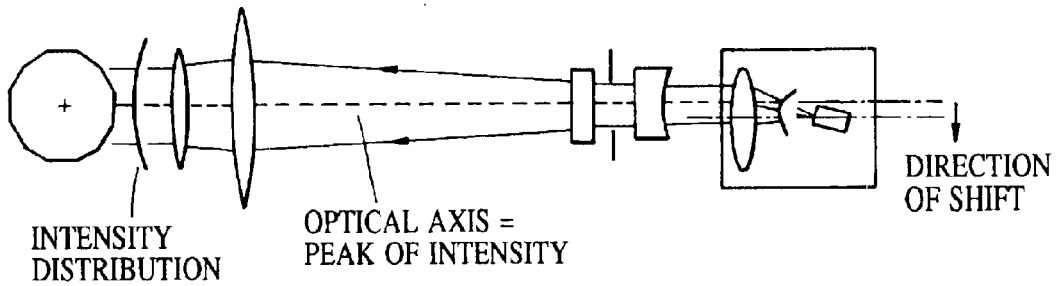

The collimated light beam emitted from the laser unit 1 is converted, through the concave lens 4, into a slightly diverged light beam which is converted into an expanded collimated beam through the second and first fθ lenses 9 and 8. In this optical arrangement, a transverse shifting of the laser intensity distribution in the collimated light beam due to a tilt of the semiconductor laser element is corrected by merely shifting the semiconductor laser 2 and the collimator lens unit 3 in the laser unit 1 integrated into a unitary structure in parallel in the main scan direction. FIG. 3C is a diagrammatic view showing a major portion of the device in the corrected state thereof. FIG. 3A shows the chip of the semiconductor laser not tilted, and FIG. 3B shows the chip of the semiconductor laser tilted.

A shift adjustment mechanism included in the laser unit 1 shifts the semiconductor laser 2 and the collimator lens unit 3 in the main scan direction with respect to a fixing member thereof to the input optical system 41 while keeping the semiconductor laser 2 and the collimator lens unit 3 in a fixed positional relationship. After adjusting focusing and angle of view of the laser unit 1, an optical adjustment of the laser unit 1 is performed on a single tool. Specifically, the semiconductor laser 2 and the collimator lens unit 3 integrated into a unitary structure are shifted in the main scan direction in order to keep, to a predetermined value or less, the ratio of strengths of two beams which are obtained by partitioning in the main scan direction a light beam passing through a predetermined aperture arranged on a reference axis. The adjusted laser unit 1 causes the peak of the laser strength distribution to be approximately aligned with the optical axis of the input optical system 41, and can emit a collimated light beam in parallel with the optical axis of the input optical system 41. With this arrangement, each laser unit 1 provides component interchangeability.

The concave lens 4 is axially moved to correct variations in focusing in the main scan direction. There are three reasons for correcting focus variations in the main scan direction.

(1) The width of the deflection surface of the polygon mirror is narrower in the main scan direction in the OFS optical system than that of the deflection surface of the polygon mirror in the UFS optical system. It is therefore difficult to assure an equivalent surface accuracy level in the main scan direction.

(2) Since the light beam is twice transmitted through the first and second fθ lenses 8 and 9 in the OFS optical system, the effect of the surface accuracy of the fθ lens is doubled. Further in the OFS optical system, the number of facets of the polygon mirror increases, and the focal length of the fθ lens increases accordingly. The sensitivity of the surface accuracy increases to the degree that variations in focusing are not negligible.

(3) To satisfy a requirement of a miniature spot at a high resolution, a mechanism for correcting focusing within a narrow depth of focus is needed.

As is conventionally done, focusing in the sub scan direction is performed by axially moving the cylindrical lens 6 after the adjustment of the concave lens 4.

The reflective mirror 7 guides the incident light beam to the center of scan of the polygon mirror (namely approximately at the center of the deflection angle). The reflective mirror 7 bends the input optical system 41 to reduce the size thereof. The reflective mirror 7 corrects an error in the oblique angle of the light beam caused by component tolerances from the laser unit 1 to the cylindrical lens 6 in the input optical system 41. To this end, the reflective mirror 7 includes an initial adjustment mechanism which adjusts the reflective mirror 7 about an axis of rotation in parallel with the reflective mirror 7 in the main scan cross-sectional plane as shown in FIGS. 4A and 4B so that the light beam is incident at a predetermined angle on the deflection surface 10a of the polygon mirror 10.

Figure 4A:
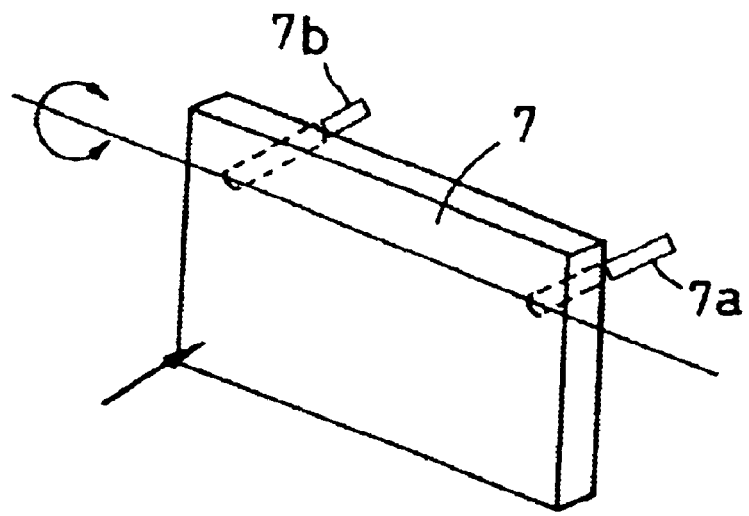
FIGS. 4A and 4B illustrate a mirror adjusting mechanism.
Figure 4B:
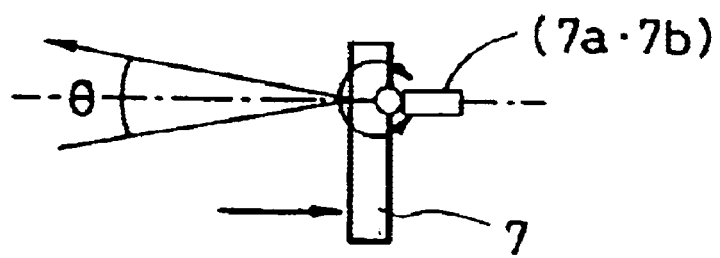

Referring to FIGS. 4A and 4B, the axis of rotation is positioned approximately at the same level as the incident light beam. Support members (7a and 7b) arranged at the same level on the rear of the reflective mirror 7 serves as pivots. By turning set screws as represented by arrows, the reflective mirror 7 is rotated in adjustment. The light beam reflected from the reflective mirror 7 is viewed through a viewing system (not shown) while the reflective mirror 7 is adjusted at a predetermined angle and then fixed.

The diaphragm aperture 5 limits in the main scan direction the width of the light beam to be incident on the deflection surface 10a of the polygon mirror 10. The width of the light beam is set to be twice to three times as wide as the width of the deflection surface 10a in the main scan direction, taking into account the scan angle range of the polygon mirror 10, a shifting of the light beam due to tolerances of the input optical system 41 and the position accuracy of the polygon mirror 10. In the first embodiment, the polygon mirror has a circumscribing circular diameter of 29 mm and 12 facets. A light beam having a width of 18 mm is incident on a deflection surface having a width of 7.5 mm. The width of the aperture in the sub scan direction is related to a spot diameter on the photoconductive drum 12.

Operation of the Light Shield Member

The operation of the light shield member 13 will now be discussed.

In the first embodiment, the semiconductor laser 2 is not extinguished when scanning outside the effective scanning area (in non-effective scanning area) and continuously remains lit. The light shield member 13 blocks the undesired light beam, out of the light beam reflected and deflected by the polygon mirror 10, at the scanning start end and the scanning stop end. The light shield member 13 thus prevents the light beam from irradiating the first and second fθ lenses 8 and 9 and the elongated cylindrical lens 11 on the peripheral areas thereof other than the effective areas thereof, thereby controlling the generation of flare.

In the first embodiment, the light shield member 13 is arranged between the polygon mirror 10 and the first fθ lens 8. Alternatively, a plurality of light shield members 13 may be arranged upstream of and downstream of another optical element. The light shield effect for blocking flare is thus even more reinforced.

Configuration of the Border Area of the Deflection Surfaces

Figure 5A:
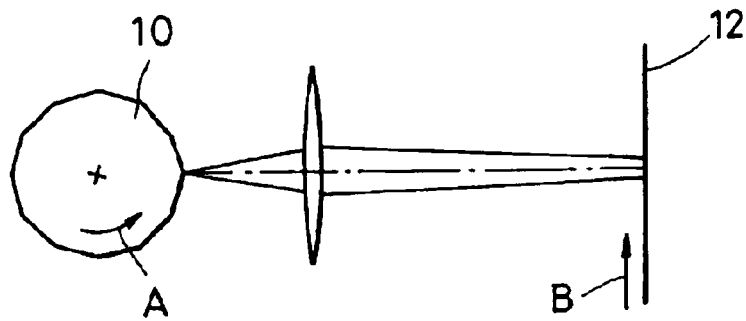
FIGS. 5A and 5B show flare at the edge of a polygon mirror.
Figure 5B:
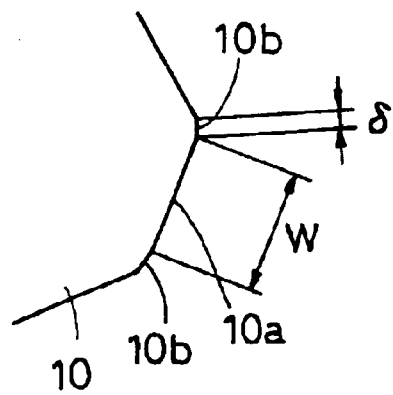

Referring to FIGS. 5A and 5B, the configuration of the border (edge) of the adjacent (deflection) surfaces of the polygon mirror will now be discussed.

In the first embodiment, the polygon mirror 10 is a polygon having 12 facets. The border area (edge portion) 10b between the adjacent surfaces of the polygon mirror 10 is a ridge, and has some width as shown in FIG. 5B. In the first embodiment, the width of the border area 10b (the width in the direction of rotation of the polygon mirror 10) is 1% or less (preferably within a range of 0.02% to 1%) of the width W of the light beam reflected and deflected by the deflection surface 10a of the polygon mirror 10, namely, the deflection surface 10a itself. Since the light source continuously remains lit in the first embodiment as already discussed, there are times when the border area 10b specularly faces the photoconductive drum 12. Referring to FIG. 5A, a portion of the light beam incident on the polygon mirror 10 is specularly reflected in a strength proportional to the width of the border area 10b, and travels along the same path as that for the ordinary scanning light beam, irradiating the center of the photoconductive drum 12 and becoming flare light.

Since the width of the polygon mirror 10 is set to be 1% or less of the width W of the light beam reflected and deflected by the deflection surface 10a of the polygon mirror 10 (namely, the deflection surface 10a), the strength of the flare light is 1% or less accordingly, and does not present adverse effect on an image in practice. In the first embodiment, further, a portion of the light beam being 90% of the peak strength of the light beam in the main scan direction is set to be incident on the border area 10b between the adjacent surfaces of the polygon mirror 10.

As discussed above, the width of the polygon mirror 10 between the adjacent surfaces of the polygon mirror 10 is set to be 1% or less of the width of the light beam in the main scan direction reflected and deflected from the deflection surface 10a of the polygon mirror 10 in the optical scanning device with the light source thereof remaining lit even in the scanning outside the effective scanning area. Even if the light reflected from the border area 10b of the polygon mirror 10 reaches the photoconductive drum 12, the image is substantially free from degradation.

Another Configuration of the Border Area Between the Deflection Surfaces

Figure 6:
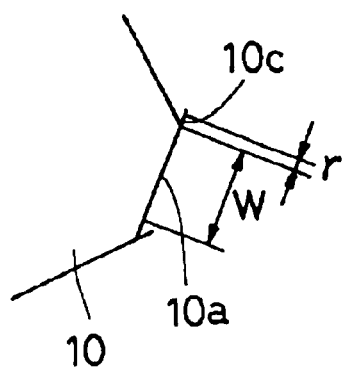
FIG. 6 shows flare at the edge of the polygon mirror.

FIG. 6 diagrammatically shows a major portion of the polygon mirror 10. As shown, one deflection surface extends over another deflection surface in the border area of the adjacent surfaces of the polygon mirror 10. The width of the extension 10c is set to be 5% or less (preferably 1% to 5%) of the beam width W of the light beam in the main scan direction reflected and deflected from the deflection surface 10a of the polygon mirror 10. Specifically, one deflection surface 10a of the polygon mirror 10 extends over a second deflection surface 10a, which in turn extends over a third deflection surface 10a.

Unlike the case shown in FIG. 5A, when the input light beam is incident on the deflection surface, no flare is generated. A light beam width y corresponding to the extension of the deflection surface is simply added.

In the OFS optical system, the width of the deflection surface in the main scan direction determines the width of the light beam, namely, the spot diameter in the main scan direction. The tolerance is thus determined to control variations in the width of the deflection surface. A variation as large as 5% or so in the spot diameter is permissible, and a manufacturing method is organized to form the extension to prevent the generation of flare. If the adjacent deflection surfaces are extended in one side only, the width of each deflection surface including the extension thereof is uniformly managed, and the variations in the spot diameter in the main scan direction are thus controlled.

Support Method of the Elongated Cylindrical Lens

A support method of the elongated cylindrical lens 11 of the present invention will now be discussed, referring to FIG. 7.

The cylindrical lens 11 is elongated because it is arranged in the vicinity of the photoconductive drum 12. To prevent thermal contraction and vibration, the elongated cylindrical lens 11 is installed as shown in FIGS. 7A, 7B, and 7C.

Figure 7A:
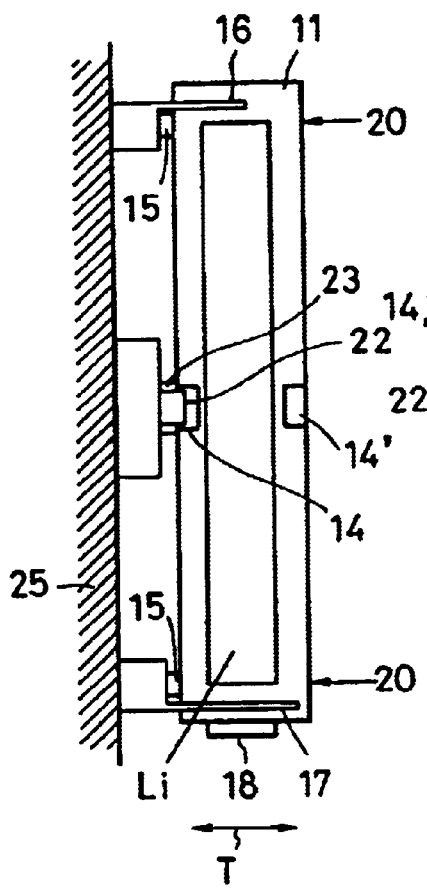
FIGS. 7A–7D illustrate a support method for supporting the elongated cylindrical lens.

FIG. 7A is a side view of the elongated cylindrical lens 11 viewed from a light incident side thereof. FIG. 7B is a top view of the elongated cylindrical lens 11 viewed from above. FIG. 7C shows the elongated cylindrical lens 11 in the installed state thereof viewed from a light exit side thereof. Li represents a light incident plane and Lo represents a light exit plane.

Referring to FIG. 7A, position alignment portions 14 and 14' respectively serve as lens center reference points, and include slots arranged at the centers of both long edges of the elongated cylindrical lens 11 (in the main scan direction). In the first embodiment, the position alignment portion 14 receives a projecting member 22 projecting from a housing 25, thereby positioning the elongated cylindrical lens 11 in the longitudinal direction thereof. The projecting member 22 is arranged on the center of the housing 25 corresponding to the longitudinal center of the elongated cylindrical lens 11.

Figure 7B:
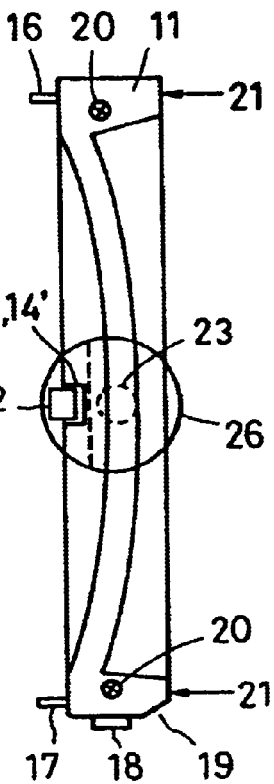
Figure 7C:
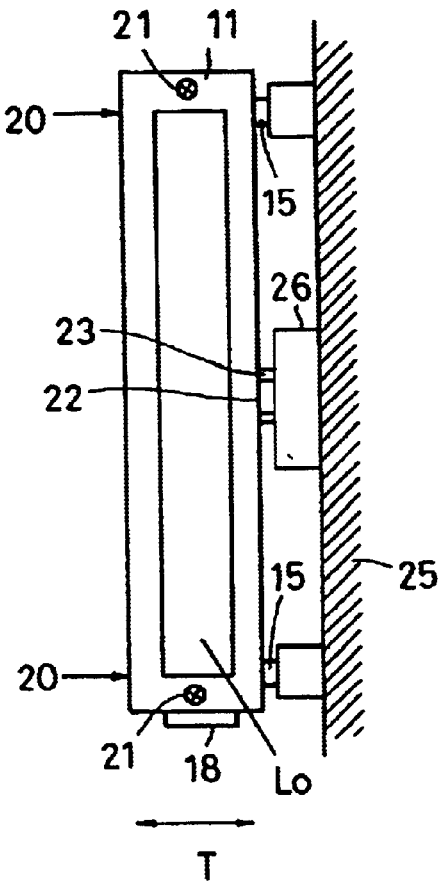

The elongated cylindrical lens 11 is received by support members 16 and 17 in practice at three points as shown in FIGS. 7A and 7B so that a predetermined flatness is assured on the elongated cylindrical lens 11. The support member 16 has a linear support surface extending to the middle of the height of the elongated cylindrical lens 11, and the support member 17 has a linear support surface extending to almost the entire height of the elongated cylindrical lens 11.

The vertical direction (the sub scan direction) T of the elongated cylindrical lens 11 is determined when two projections 15 arranged on both ends of the elongated cylindrical lens 11 abut the seats of the housing 25. To fix the elongated cylindrical lens 11, spring members (not shown) urge the elongated cylindrical lens 11 at position alignment members 15, 16, and 17 in directions represented by arrows 20 and 21. In the first embodiment, the elongated cylindrical lens 11 is supported at a total of four points. Referring to FIG. 7B, a mounting orientation indicator chamfer 19 is shown. By making the external configuration asymmetrical, the elongated cylindrical lens 11 is prevented from being installed in a wrong orientation.

The elongated cylindrical lens 11, supported at the ends thereof, is floating in the air in the center portion thereof, and is thus subject to vibrations. As shown in FIGS. 7A, 7B, and 7C, a glued seat 26 is arranged on the housing 25 independent of the projecting member 22 in a manner such that the seat 26 remains out of contact with the elongated cylindrical lens 11. A gap between the outer housing of the elongated cylindrical lens 11 and the glued seat 26 is set to be about 0.4 mm or less (preferably 0.03 mm to 0.4 mm), and an adhesive agent 23 is applied in the gap to provide a light bond. In this way, the bonding strength is controlled to a light level sufficient enough to control vibrations. With this arrangement, the seat 26 does not interfere with the mating at the center reference points and the positioning at the four points. The light bonding refers to a bonding strength that does not disturb the positioning of the elongated cylindrical lens 11. The adhesive agent 26 is an ultraviolet setting agent.

Figure 7D:
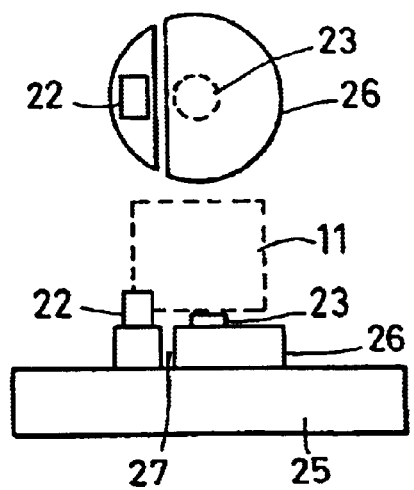

In the first embodiment, a spacing 27 is allowed between the seat 26 and the projecting member 22 as shown in FIG. 7D, and there is no possibility that the adhesive agent 23 flows to the center reference. The seat 26 is not formed on the elongated cylindrical lens 11. Forming the seat 26 on the elongated cylindrical lens 11 would make the outer configuration of the elongated cylindrical lens 11 complex, and molding stability would be degraded.

As discussed above, the elongated cylindrical lens 11 constituting the second optical system 43 is provided with the position alignment portions 14 and 14' in the centers of the longitudinal edges. The seat 26 is arranged on the housing 25 in such a manner that the seat 26 remains out of contact with the elongated cylindrical lens 11, and the adhesive agent 23 is applied in the gap between the seat 26 and the elongated cylindrical lens 11 to fix the elongated cylindrical lens 11 to the housing 25. This arrangement controls the effect of external vibrations, thereby keeping the lens free from vibrations.

A projecting member may be arranged on the elongated cylindrical lens 11 and a position alignment notch may be formed on a glued seat. In an image forming apparatus that undergoes a BAE (Background Area Exposure) process using a blank exposure to be discussed later, the effective scanning area becomes longer, and the length of the elongated cylindrical lens in the main scan direction also needs to be lengthened. This structure is more sensitive to vibration. For this reason, the above-referenced support method for the elongated cylindrical lens is particularly useful. The first embodiment has been discussed in conjunction with the elongated cylindrical lens. The first embodiment is equally applicable to other elongated lenses.

Compact Optical Scanning Device

Figure 8:
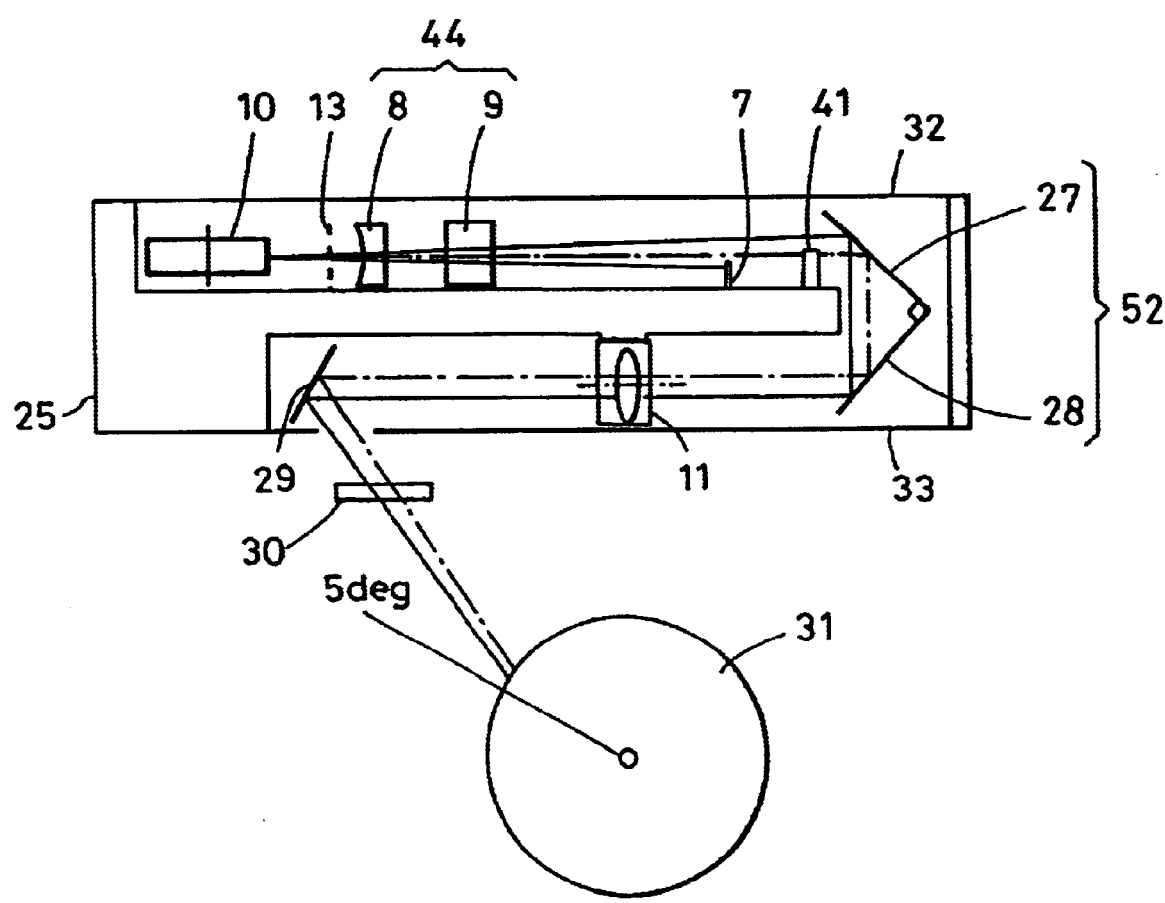
FIG. 8 shows another major portion of the first embodiment of the present invention.

FIG. 8 is a sub scan cross-sectional view of an optical scanning device that is a compact version of the optical scanning device shown in FIG. 1. As shown in FIG. 8, components identical to those described with reference to FIG. 1 are designated with the same reference numerals.

Referring to FIG. 8, optical elements in the input optical system and from the polygon mirror 10 to the fθ lens system 44 are arranged in an upper portion of the housing 25. A mirror assembly 52 composed a pair of first and second reflective mirrors 27 and 28 arranged in a right-angle configuration is used to route the optical path to bend to a lower portion of the housing 25. The dot-dash chain line represented by BB shown in FIG. 1B is bent by first through third mirrors 27, 28 and 29 as shown in FIG. 8. The first and second mirrors 27 and 28 are separately installed in the housing 25. To control, to a predetermined range, an error in the right angle made between the two mirrors, an adjustment mechanism is arranged on one of the two reflective mirrors. The adjustment mechanism is adjusted beforehand with respect to the housing 25 so that a light beam in parallel with a reference of the housing 25, for example, the mounting surface of the polygon mirror travels in parallel at a predetermined height from the reference after being reflected from the mirror assembly 52.

The third reflective mirror 29 guides the light beam from the housing 25 to the photoconductive drum 12. The third reflective mirror 29 is supported at three set screws on the back side thereof. Turning the three set screws adjusts the arrival point of the light beam to the photoconductive drum 12 (the position around the circumference of the photoconductive drum 12), the inclination of the scanning line (the parallelism between the scanning line and the axis of rotation of the photoconductive drum 12), and an overall magnification (the distance between the third reflective mirror 29 and the photoconductive drum 12) to their predetermined performance values.

A dust cover glass 30 keeps the optical elements away from dust and dispersed toner from the photoconductive drum 12. The dust cover glass 30 can be removed to remove smear. A light shield plate 41 blocks a light beam specularly reflected from the θ lens system 44, and also works as a rib for reinforcing the bottom plate of the housing 25. The height of the light shield plate 41 is determined so that the specularly reflected light beam does not reach the mirror assembly 52. Covers 32 and 33 enclose the housing 25.

Second Embodiment

Figure 9A:
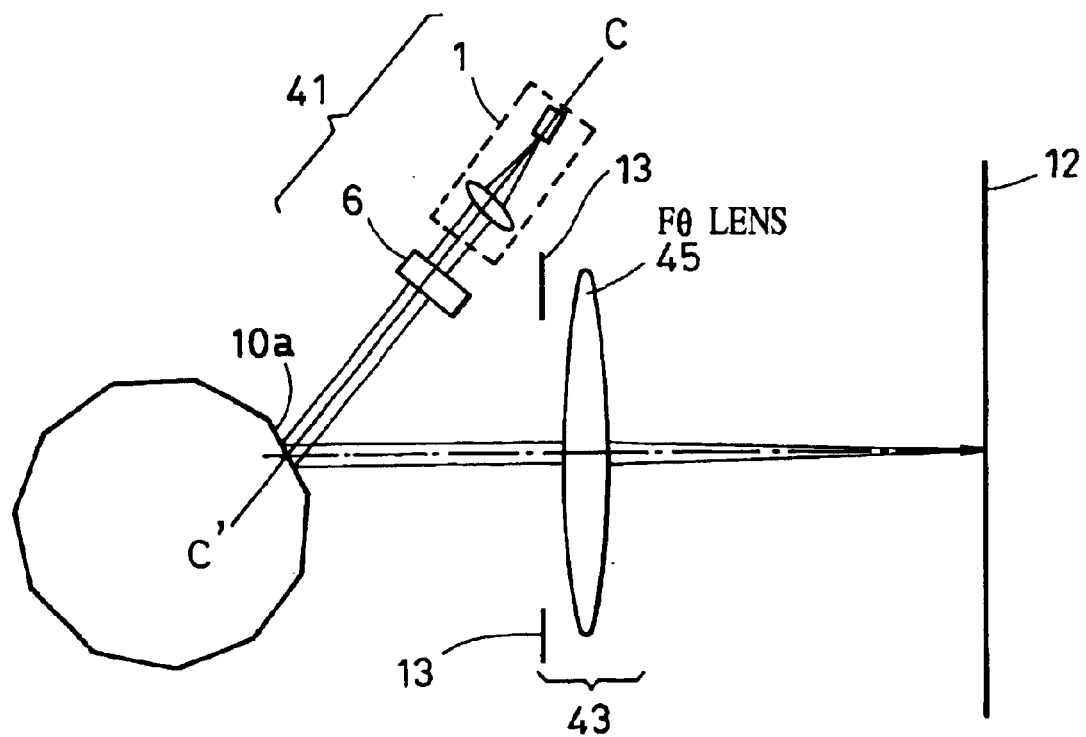
FIGS. 9A and 9B show a major portion of a second embodiment of the present invention.
Figure 9B:
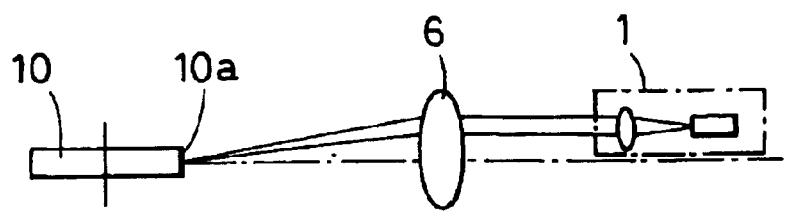

FIG. 9A shows a main scan cross-sectional view of a second embodiment of the optical scanning device of the present invention. FIG. 9B is a sub scan cross-sectional view of the optical scanning device taken along line CC' in FIG. 9A. As shown, components identical to those described with reference to FIGS. 1A–1C are designated with the same reference numerals. The write start position detection optical system 35 shown in FIG. 1A is not shown in FIG. 9A.

The difference between the second embodiment and the first embodiment is that the input optical system 41 is constructed of a UFS optical system, that the size of the deflection surface 10a of the polygon mirror 10 is set to be larger that in the first embodiment, and that the second optical system 43 is fabricated of a single lens (fθ lens) 45. The remaining construction and the optical operation of the second embodiment remain unchanged from those of the first embodiment. The second embodiment provides the same advantage as that of the first embodiment.

The width of the deflection surface 10a of the polygon mirror 10 in the main scan direction in the second embodiment is the same as the width of the light beam incident on the fθ lens 45 after being reflected and deflected from the polygon mirror 10, and is three times as large as the width of the deflection surface of the polygon mirror in the OFS optical system. As the scan angle range increases, the incident light beam suffers from shading on the deflection surface. For example, at a resolution of 600 dpi, the scanning efficiency (duty) of a device having a capacity of 50 paper sheets is 70% or so. If a higher speed is intended, a lighting time per one line becomes short, and extinguishing a light source becomes difficult. The UFS optical system also requires the light source to continuously remain lit, although not to the degree that the OFS optical system requires.

Referring to FIG. 9B, the light beam emitted from the laser unit 1 is transmitted through a location out of the optical axis of the cylindrical lens 6, and is incident at an oblique angle on the deflection surface 10a of the polygon mirror 10. With the light beam incident on the deflection surface 10a of the polygon mirror 10 at an oblique angle in the sub scan cross-sectional plane, the specularly reflected light beam from the deflection surface 10a does not return to the light source even if the deflection surface 10a is perpendicular to the optical axis of the input optical system in the main scan cross-sectional plane. The stability of the operation of the light source is assured.

In the second embodiment, the light shield member 13 blocks the undesired light beam reflected and deflected from the polygon mirror 10 at the scanning start end and the scanning stop end as in the first embodiment. The generation of flare light is thus controlled. In the second embodiment, the scanning efficiency is set to be 70% or higher.

Image Forming Apparatus

Figure 10:
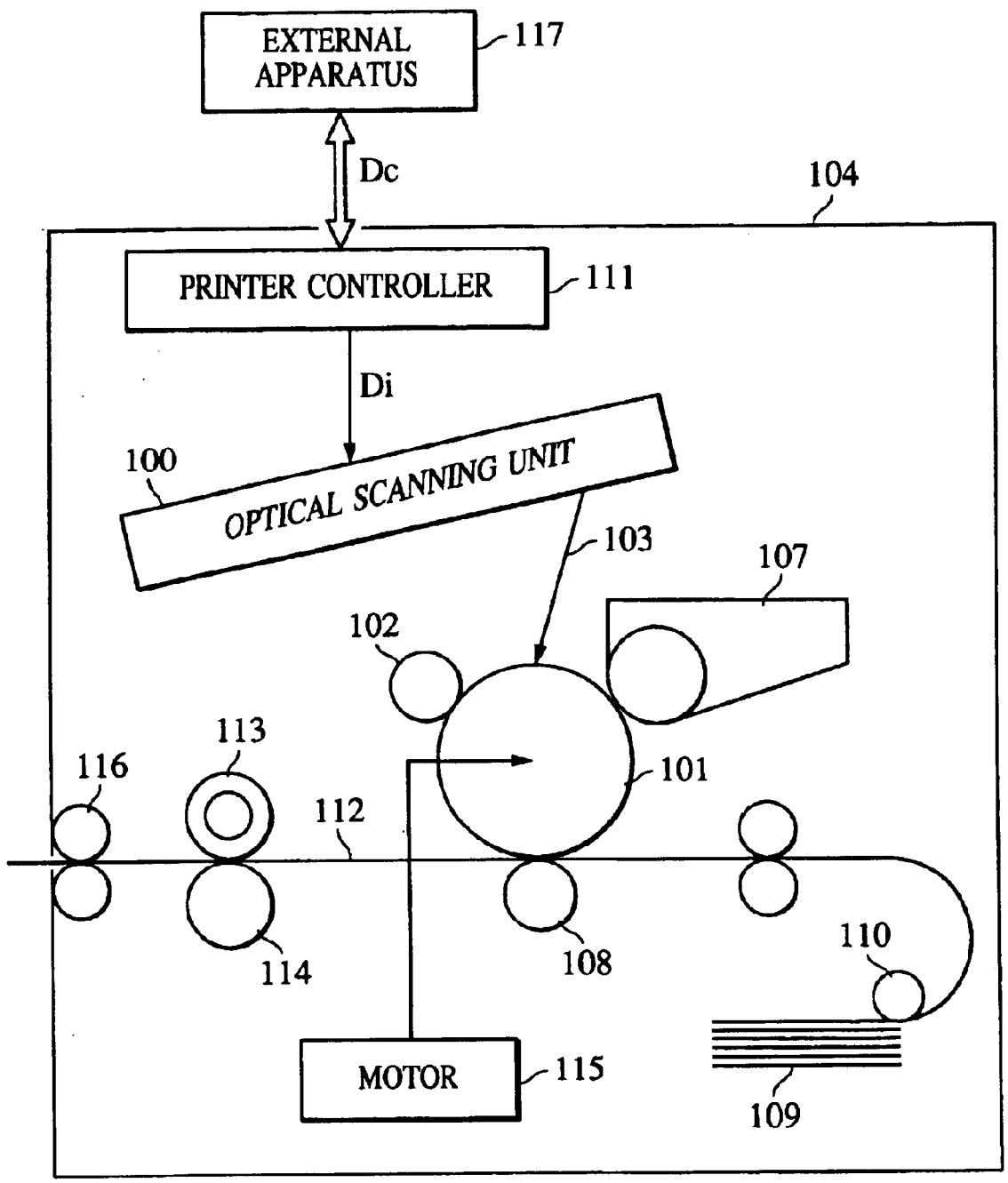
FIG. 10 is a sub scan cross-sectional view of a image forming apparatus of the present invention.

FIG. 10 is a cross-sectional view showing a major portion of an embodiment of an image forming apparatus in the sub scan direction. As shown in FIG. 10, there is shown an image forming apparatus 104. The image forming apparatus 104 receives code data Dc from an external apparatus 117 such as a personal computer. The code data Dc is converted into image data (dot data) Di by a printer controller 111 in the image forming apparatus. The image data Di is input to an optical scanning unit 100 having the construction of one of the first embodiment and the second embodiment. The optical scanning unit 100 outputs a light beam 103 modulated with the image data Di, and the light beam 103 scans a photoconductive drum 101 in the main scan direction.

The photoconductive drum 101 serving as an electrostatic latent image support body (photosensitive body) is rotated clockwise by a motor 115. Along with the rotation, the photoconductive surface of the photoconductive drum 101 moves with respect to the light beam 103 in the sub scan direction perpendicular to the main scan direction. A charging roller 102 is arranged above the photoconductive drum 101 to be in contact with the surface of the photoconductive drum 101 to uniformly charge the surface of the photoconductive drum 101. The surface of the photoconductive drum 101 uniformly charged by the charging roller 102 is irradiated with the light beam 103 by the optical scanning unit 100.

As already discussed, the light beam 103 is modulated with the image data Di, and an electrostatic latent image is formed on the surface of the photoconductive drum 101 by directing the light beam 103 to the surface of the photoconductive drum 101. The electrostatic latent image is developed into a toner image by a development unit 107. The development unit 107 is arranged to be in contact with the photoconductive drum 101 downstream of the irradiation position of the light beam 103 to the photoconductive drum 101 in the direction of rotation.

The toner image developed by the development unit 107 is transferred to a paper sheet 112 as a transfer medium by a transfer roller 108. The transfer roller 108 is arranged below the photoconductive drum 101 to face the photoconductive drum 101. The paper sheet 112 is held in a paper cassette 109 in front of the photoconductive drum 101 (on the right hand side in FIG. 10). Alternatively, the paper sheet 112 may be manually fed. A paper pickup roller 110, mounted at the end of the paper cassette 109, picks up the paper sheet 112 to convey it to a paper transport path in the apparatus.

As discussed above, the paper sheet 112 having an unfixed toner image advances to a fixing unit behind the photoconductive drum 101 (on the left-hand side in FIG. 10). The fixing unit includes a fixing roller 113 including a fixing heater (not shown), and a pressure roller 114 for pressing the fixing roller 113. The fixing unit fixes the toner image onto the paper sheet 112 by pressing and heating the paper sheet 112, coming in from the transfer unit, between the fixing roller 113 and the pressure roller 114. A discharge roller 116, arranged behind the fixing roller 113, discharges the toner-image-fixed paper sheet 112 out of the image forming apparatus.

The printer controller 111 not only performs data conversion as already discussed but also controls the components including the motor 115 in the image forming apparatus and a polygon motor (not shown in FIG. 10) in the optical scanning unit 100 to be discussed later.

The material of the light shield member 13 in the first and second embodiments may be ABS material or BMC material.

As already discussed in Section "Operation of the light shield member," a plurality of light shield members 13 may be arranged, for example, one between the first fθ lens 8 and the second fθ lens 9, one between the second fθ lens 9 and the elongated cylindrical lens 11, and the last between the elongated cylindrical lens 11 and the photoconductive drum 12.

Image Processing Apparatus Employing the BAE Process

The above-referenced image forming apparatus is appropriate for use as a BAE (Background Area Exposure) image forming apparatus.

The BAE process refers to an exposure process that uses a negative toner. A portion of the surface of the photoconductive drum as the scanning surface, unirradiated with the light beam, forms an image. Since the BAE process is an exposure process for an analog copying apparatus, the BAE process is in a negative-positive relationship with an IAE (Image Area Exposure) process that is ordinarily used in typical optical scanning systems.

The exposure surface of the photoconductive drum is wider in width than the image forming area thereof. It is necessary to expose the photoconductive drum outside the image forming area to keep it from being developed. The exposure of such area is called a blank exposure. In an analog apparatus, the blank area is typically exposed by an auxiliary light source. The scanning width of the scanning beam is extended in the optical scanning system so that the image forming area plus the width of the blank exposure is treated as an optically effective scanning area. Since the scanning width for exposure becomes longer in the BAE process, a duration of time from the exposure scanning end to the next write start position between lines becomes even shorter. With the light source continuously lit, the stability of the light source is assured. The detection accuracy of the image write start position and the stability of the output of the light source are improved, leading to a good quality image presentation.

Figure 11:
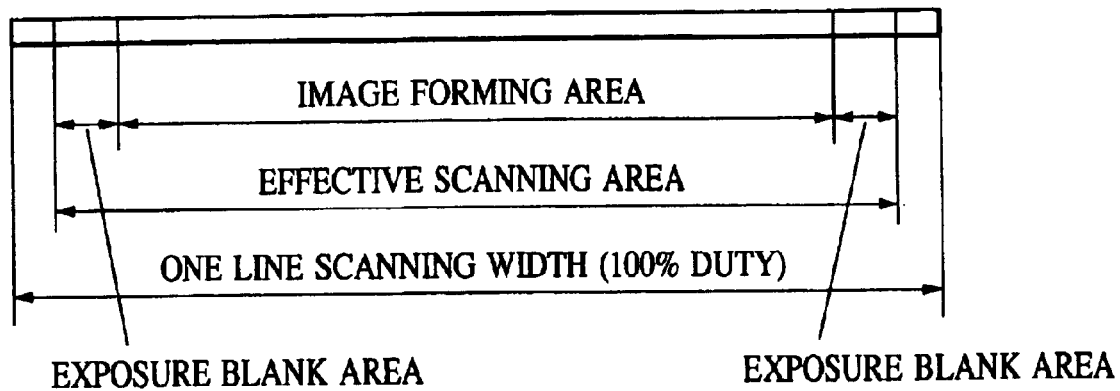
FIG. 11 illustrates an effective scanning area of one line of a scanning optical system in a BAE process.

FIG. 11 shows the relationship between the effective scanning area, the image forming area, and the blank exposure area in one scan line width in the BAE process.

As shown, the image forming apparatus employing the BAE process provides a higher scanning efficiency with a longer scan width, because the effective scanning area includes the blank exposure areas on both sides of the image forming area. Since the BD sensor for detecting the image write start position is arranged upstream of the blank exposure, the duration of time from the scanning stop to the image write start becomes even shorter. For this reason, the laser needs to be continuously lit to stabilize the light source. The light shield member is required to control the flare. Both the UFS optical system and the OFS optical system need the continuous light of the light source. Particularly when the OFS optical system is combined with the BAE process, the scanning efficiency (duty) become large, and the duration of the non-effective scanning area is short. The continuous lighting of the light source is required.

In accordance with the present invention, in the optical scanning device having the light source continuously remaining lit outside the effective scanning area of one line, the light shield member is arranged between the optical deflector and the scanning surface to block at least a portion of the light beam which is reflected and deflected by the optical deflector and scans outside an effective scanning area, thereby controlling flare light. An optical scanning device presenting a good quality image and an image forming apparatus incorporating the optical scanning device are thus provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical scanning device comprising:

a first optical system, including a light source, for directing a light beam emitted from the light source to deflection means; and a second optical system for focusing the light beam deflected by the deflection means and performing a line scanning on an effective scanning area of a scanning surface, wherein the light source is continuously kept lit between a line scanning and the next line scanning and wherein a light shield member is positioned between the deflection means and the scanning surface to block at least a portion of the light beam emitted during the period of time when the light source is continuously kept lit between a line scanning and the next line scanning.

2. An optical scanning device according to claim 1, wherein a scanning efficiency of the optical scanning device is 70% or higher.

3. An optical scanning device according to claim 1, wherein the light beam from said first optical system is incident at an oblique angle on a deflection surface of the deflection means in a sub scanning cross-sectional plane.

4. An image forming apparatus comprising:
an optical scanning device according to claim 1;
a photoconductive body arranged on the scanning surface of said optical scanning device;
development means for developing, into a toner image, an electrostatic latent image that has been formed with the light beam scanning said photoconductive body;
transfer means for transferring the developed toner image onto a paper sheet; and
fixing means for fixing the transferred toner image onto the paper sheet.

5. An image forming apparatus comprising:
an optical scanning device according to claim 1; and
a printer controller for converting code data input from an external device into an image signal and feeding the image signal to said optical scanning device.

6. An image forming apparatus according to one of claims 4 and 5, wherein the image is formed through a Background Area Exposure process.

7. An optical scanning device comprising:
a first optical system, including a light source, for directing a light beam emitted from the light source to a deflection surface of deflection means in a beam width wider than the width of the deflection surface in a main scan direction; and
a second optical system for focusing the light beam, deflected by the deflection means and performing a line scanning on an effective scanning area of a scanning surface,
wherein the light source is continuously kept lit between a line scanning and the next line scanning and wherein a light shield member is positioned between the deflection means and the scanning surface to block at least a portion of the light beam emitted during the period of time when the light source is continuously kept lit between a line scanning and the next line scanning.

8. An optical scanning device according to claim 7, wherein a scanning efficiency of the optical scanning device is 80% or higher.

9. An optical scanning device according to claim 7, wherein the light beam from said first optical system is incident at an oblique angle on a deflection surface of the deflection means in a sub scanning cross-sectional plane.

10. An image forming apparatus comprising an optical scanning device according to claim 7,
wherein the width of a border area between adjacent deflection surfaces of the deflection means in a main scan direction is 1% or less of the width of each deflection surface in the main scan direction.

11. An image forming apparatus comprising an optical scanning device according to claim 7,
wherein in a border area between adjacent deflection surfaces of the deflection means, one deflection surface extends over the other deflection surface, and the length of the extension in a main scan direction is 5% or less of the beam width of the light beam reflected and deflected from the deflection surface in the main scan direction.

12. An image forming apparatus comprising:
an optical scanning device according to claim 7;
a photoconductive body arranged on the scanning surface of said optical scanning device;
development means for developing, into a toner image, an electrostatic latent image that has been formed with the light beam scanning said photoconductive body;
transfer means for transferring the developed toner image onto a paper sheet; and
fixing means for fixing the transferred toner image onto the paper sheet.

13. An image forming apparatus comprising:
an optical scanning device according to claim 7; and
a printer controller for converting code data input from an external device into an image signal and feeding the image signal to said optical scanning device.

14. An image forming apparatus according to one of claims 12 and 13, wherein the image is formed through a Background Area Exposure process.

15. An optical scanning device comprising:
a first optical system, including a light source, for directing a light beam emitted from the light source to deflection means; and
a second optical system for focusing the light beam deflected by the deflection means and performing a line scanning on an effective scanning area of a scanning surface,
wherein the light source is continuously kept lit between a line scanning and the next line scanning.

16. An image forming apparatus comprising:
an optical scanning device according to claim 15;
a photoconductive body arranged on the scanning surface of said optical scanning device;
development means for developing, into a toner image, an electrostatic latent image that has been formed with the light beam scanning said photoconductive body;
transfer means for transferring the developed toner image onto a paper sheet; and
fixing means for fixing the transferred toner image onto the paper sheet.

17. An image forming apparatus comprising:
an optical scanning device according to claim 15; and
a printer controller for converting code data input from an external device into an image signal and feeding the image signal to said optical scanning device.

18. An optical scanning device comprising:
a first optical system, including a light source, for directing a light beam emitted from the light source to a deflection surface of deflection means in a beam width wider than the width of the deflection surface in a main scan direction; and
a second optical system for focusing the light beam deflected by the deflection means and performing a line scanning on an effective scanning area of a scanning surface,
wherein the light source is continuously kept lit between a line scanning and the next line scanning.

19. An image forming apparatus comprising:
an optical scanning device according to claim 18;
a photoconductive body arranged on the scanning surface of said optical scanning device;
development means for developing, into a toner image, an electrostatic latent image that has been formed with the light beam scanning said photoconductive body;
transfer means for transferring the developed toner image onto a paper sheet; and
fixing means for fixing the transferred toner image onto the paper sheet.

20. An image forming apparatus comprising:
an optical scanning device according to claim 18; and
a printer controller for converting code data input from an external device into an image signal and feeding the image signal to said optical scanning device.

* * * * *